United States Patent
Achtelstetter

(10) Patent No.: US 7,464,299 B2
(45) Date of Patent: *Dec. 9, 2008

(54) ACPI NAME SPACE VALIDATION

(75) Inventor: Dieter Achtelstetter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

This patent is subject to a terminal disclaimer.

(21) Appl. No.: 11/275,032

(22) Filed: Dec. 5, 2005

(65) Prior Publication Data

US 2006/0085657 A1    Apr. 20, 2006

Related U.S. Application Data

(63) Continuation of application No. 11/052,039, filed on Feb. 8, 2005, now Pat. No. 6,988,223, which is a continuation of application No. 10/119,152, filed on Apr. 10, 2002, now Pat. No. 6,901,539.

(51) Int. Cl.
*G06F 11/00*    (2006.01)

(52) U.S. Cl. .......................... 714/38; 713/300

(58) Field of Classification Search ............. None
See application file for complete search history.

(56) References Cited

U.S. PATENT DOCUMENTS

| | | | | |
|---|---|---|---|---|
| 4,710,866 A * | 12/1987 | Zolnowsky et al. | ........ | 712/207 |
| 5,313,616 A * | 5/1994 | Cline et al. | ........ | 717/127 |
| 5,668,999 A * | 9/1997 | Gosling | ........ | 717/126 |
| 5,903,894 A * | 5/1999 | Reneris | ........ | 707/100 |
| 6,026,236 A * | 2/2000 | Fortin et al. | ........ | 717/127 |
| 6,185,677 B1 * | 2/2001 | Nijhawan | ........ | 713/2 |
| 6,351,847 B1 * | 2/2002 | Sakamoto et al. | ........ | 717/127 |
| 6,453,461 B1 * | 9/2002 | Chaiken | ........ | 717/124 |
| 6,748,461 B2 * | 6/2004 | Oshins et al. | ........ | 710/8 |
| 6,779,187 B1 * | 8/2004 | Hammond | ........ | 719/331 |
| 6,883,102 B2 * | 4/2005 | Williams et al. | ........ | 713/300 |
| 6,886,111 B1 * | 4/2005 | Tran | ........ | 714/38 |
| 6,954,880 B2 * | 10/2005 | Shaw | ........ | 714/38 |
| 6,971,048 B1 * | 11/2005 | Hanson et al. | ........ | 714/41 |

(Continued)

OTHER PUBLICATIONS

Microsoft Corporation, "NET Framework Developer's Guide: Implementing Callback Functions", printed from http://msdn.microsoft.com/library/en-us/cpguide/html/cpconusingcallbackfunctions.asp on Jan. 29, 2002, 3 pages.

Compaq computer corporation et al., "Advanced Configuration and Power Interface Specification, Revision 2.0" (Table of Contents and Introduction), Jul. 27, 2000 15 pages.

*Primary Examiner*—Gabriel L Chu
(74) *Attorney, Agent, or Firm*—Wolf, Greenfield & Sacks, P.C.

(57) ABSTRACT

A method and system for passively validating an advanced configuration and power interface (ACPI) name space are provided. A filter driver may be adapted for use as a verification tool that intercepts requests by the ACPI driver to evaluate objects in the ACPI name space. Prior to the ACPI driver evaluating the object in the ACPI name space, the verification tool validates the object by looking up and validating a corresponding object in a test name space created from the ACPI name space. When the object validates, control is returned to the ACPI driver. When the object does not validate, the verification tool may either log the error to a log file, initiate a debugger to fix the problem, or both.

19 Claims, 4 Drawing Sheets

U.S. PATENT DOCUMENTS 6,980,944 B1 * 12/2005 Oshins et al. ................. 703/17
7,047,522 B1 * 5/2006 Dixon et al. ................ 717/131
7,111,307 B1 * 9/2006 Wang ........................ 719/321

* cited by examiner

ACPI NAME SPACE VALIDATION

CROSS-REFERENCE TO RELATED CASES

This application is a continuation application of Ser. No. 11/052,039, filed Feb. 8, 2005, having the title ACPI NAME SPACE VALIDATION, which is a continuation of U.S. Pat. No. 6,901,539, issued May 31, 2005, having the title ACPI NAME SPACE VALIDATION.

FIELD OF THE INVENTION

The invention relates generally to peripheral device detection and interaction with computer systems. More specifically, the invention relates to an advanced configuration and power interface (ACPI) name space validation tool to validate an ACPI name space exported by a computer's ACPI compliant BIOS.

BACKGROUND OF THE INVENTION

Computer systems generally communicate with attached hardware and peripheral devices through a basic input output system (BIOS), which includes a set of routines that provide an interface between the operating system and the hardware. The BIOS typically supports all of a computer's peripheral technologies and internal services such as the realtime clock (time and date).

When a computer is booted, the BIOS tests the system and prepares the computer for operation by querying its own memory bank for drive and other configuration settings. The BIOS also searches for other BIOS's on any plug-in boards in the computer and sets up pointers (interrupt vectors) in memory to access those routines. The BIOS also loads the operating system (OS) and passes control to the OS when the BIOS has completed its startup routines. The BIOS accepts requests from device drivers as well as application programs for interfacing with hardware and other peripheral devices.

When the BIOS passes control to the operating system, the BIOS typically includes hardware device and peripheral device configuration information from which the OS interfaces with the attached devices. In order to provide better power management within computer systems, a consortium of companies developed and adopted the Advanced Configuration and Power Interface (ACPI) specification that makes hardware status information available to the operating system. ACPI is an open industry specification that defines a flexible and extensible hardware interface for the system board, and enables a computer to turn its peripherals on and off for improved power management, especially in portable devices such as notebook computers. ACPI also allows a computer to be turned on and off by external devices, so that the touch of a mouse or the press of a key on a keyboard will "wake up" the computer.

The ACPI specification includes hardware interfaces, software interfaces (APIs), and data structures that, when implemented, support OS-directed configuration and power management. Software designers can use ACPI to integrate power management features throughout a computer system, including hardware, the operating system, and application software. This integration enables the OS to determine which devices are active and handle all of the power management resources for computer subsystems and peripherals.

When an ACPI BIOS passes control of a computer to the OS, the BIOS exports to the OS a data structure containing the ACPI name space, which may be graphically represented as a tree. A sample ACPI name space according to the ACPI specification is illustrated in FIG. 1. The name space acts as a directory of ACPI devices connected to the computer, and includes objects that further define or provide status information for each ACPI device. Each node in the tree represents a device, while the nodes, subnodes and leaves represent objects that, when evaluated by the OS, will control the device or return specified information to the OS, as defined by the ACPI specification. The OS, or a driver accessed by the OS, may include a set of functions to enumerate and evaluate name space objects. When the OS calls a function to return the value of an object in the ACPI name space, the OS is said to evaluate that object.

While the ACPI name space is defined by the ACPI specification, it is often difficult to ensure that a BIOS's ACPI name space conforms to the specification. When the name space does not conform to the specification the operating system might not function properly, or might not function at all (i.e. the OS will not boot). Thus, there is a need for a tool that can validate an ACPI name space and identify problems to a developer or original equipment manufacturer (OEM) as they are developing the name space. Also, when a problem in the name space is detected, a tool is needed which will not prohibit an OS from booting.

BRIEF SUMMARY OF THE INVENTION

The inventive method and system overcomes the problems of the prior art by validating the name space prior to the ACPI driver evaluating any objects stored within the name space. A first aspect of the invention provides a method for validating an ACPI name space. A verifier module intercepts commands sent to the ACPI driver to evaluate objects stored in the ACPI name space. Concurrently to the ACPI driver evaluating the object in the ACPI name space, the verifier module validates a corresponding object in a test name space. The method may be embodied in computer readable instructions stored on a computer readable medium.

Another aspect of the invention provides a data processing system that includes computer readable instructions for validating an ACPI name space. There is a memory that stores the ACPI name space, a test name space, a test case library, and the computer readable instructions. There is also a processor that can execute the computer readable instructions to perform the ACPI name space validation. A verifier module intercepts ACPI driver commands to evaluate objects in the ACPI name space. The verifier module retrieves a test case set from the test case library and performs the test case set on a corresponding object in the test name space.

Another aspect of the invention provides another method for validating an ACPI name space. The method steps include a verifier module creating a test name space based on the ACPI name space. Each request to evaluate an object in the ACPI name space is duplicated to the verifier module. Prior to an ACPI driver completing evaluation of the object in the ACPI name space, the verifier tool retrieves a test case set from a test case library and validates, using the test case set, a corresponding object in the test name space. When validation fails, the verifier module either logs the failure to a log file, launches a debugger, or both.

BRIEF DESCRIPTION OF THE DRAWINGS

The present invention is described with respect to the accompanying figures, in which like reference numerals identify like elements, and in which.

DETAILED DESCRIPTION OF THE INVENTION

An ACPI name space verification tool passively validates an ACPI name space in real time in order to perform an ACPI specification compliance system test. The verification tool intercepts OS ACPI function calls in the ACPI driver and validates the ACPI name space by performing the called function on a test name space. Values returned by the ACPI driver pass through the verification tool. As the ACPI driver evaluates objects in the actual ACPI name space, the verification tool can perform parallel validation of the test name space. Thus, if an invalid response is received or expected, the ACPI verification tool may log the error to a file and/or initiate a debugging tool to allow the developer to correct the problem.

Figure 1:
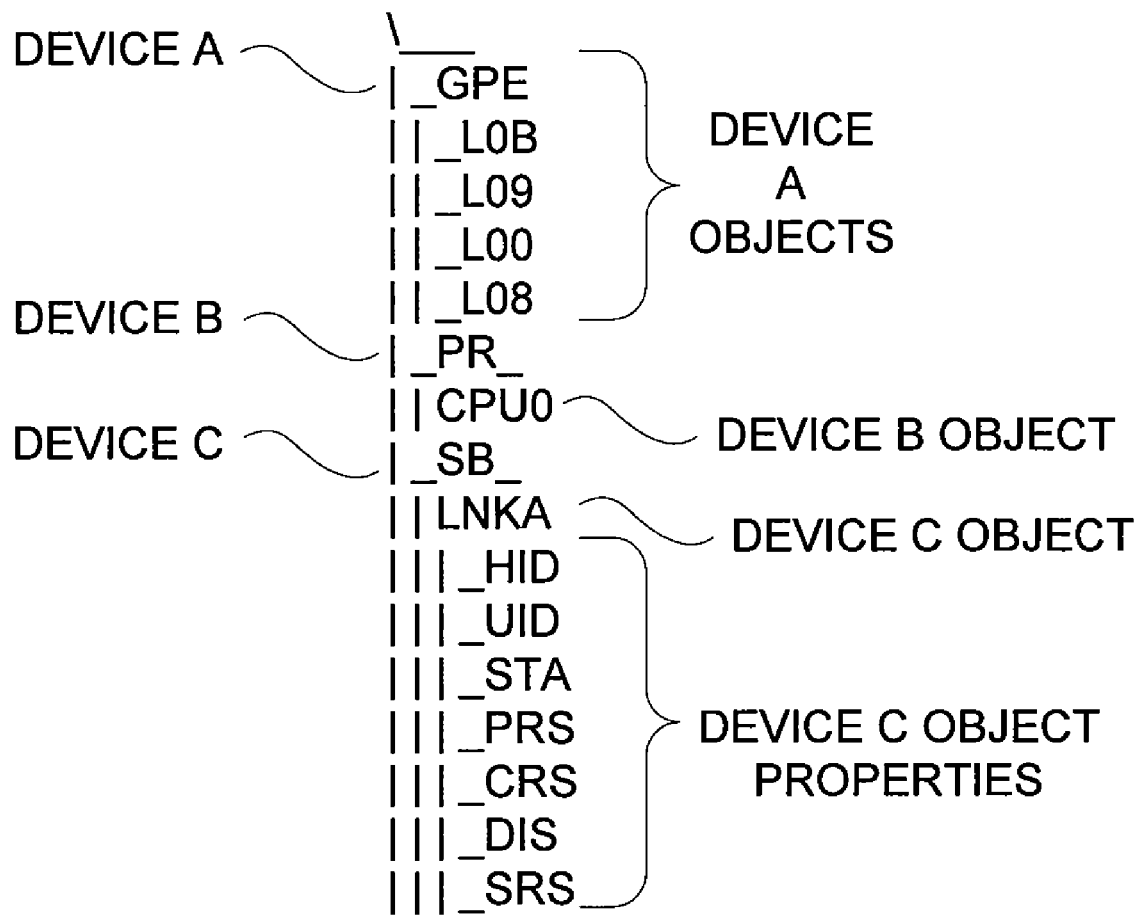
FIG. 1 illustrates a sample ACPI name space.
Figure 2:
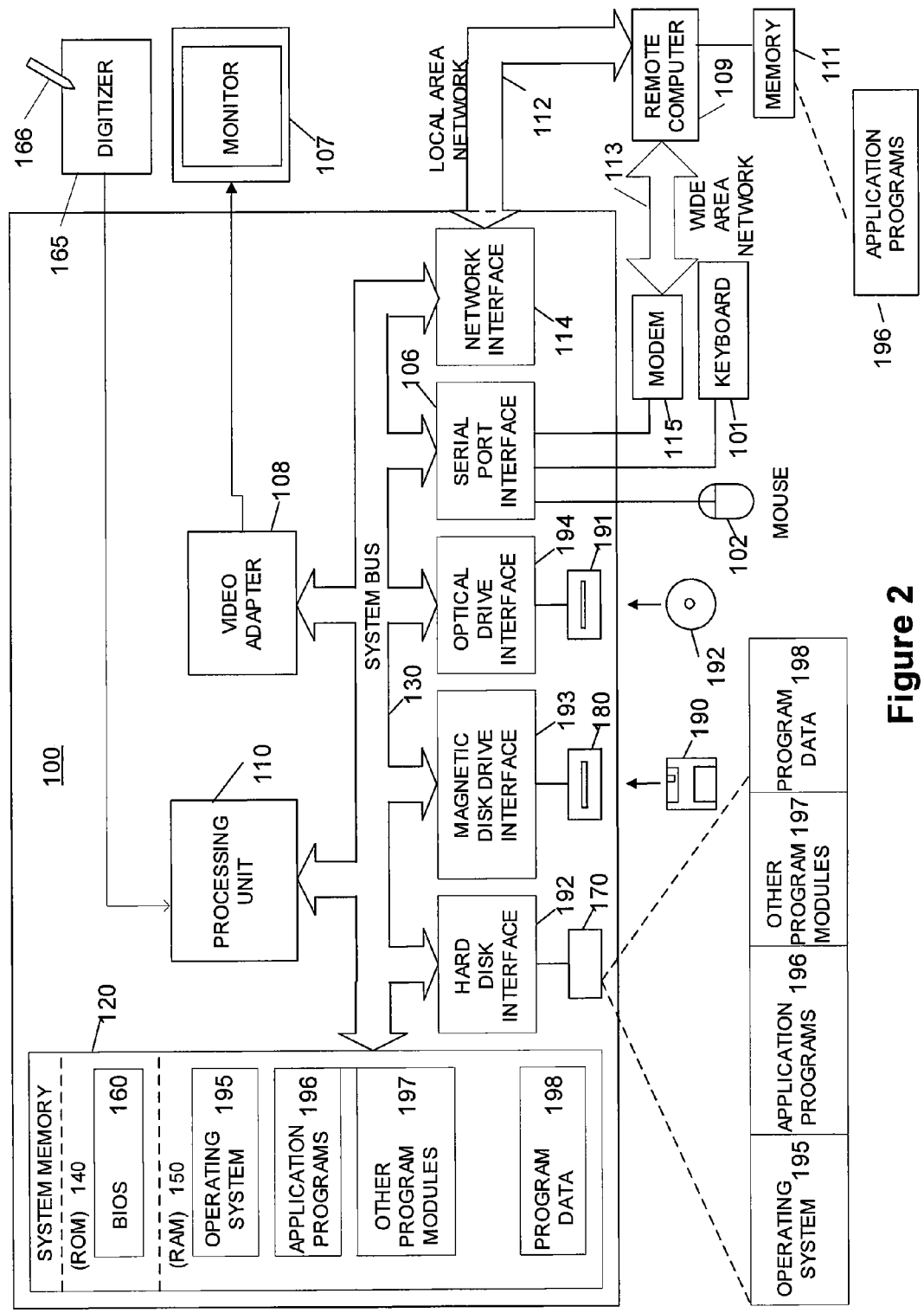
FIG. 2 illustrates a schematic diagram of a general-purpose computer that may be used with one or more embodiments of the invention.

FIG. 2 illustrates a schematic diagram of an exemplary conventional general-purpose digital computing environment that can be used to implement various aspects of the present invention. In FIG. 2, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 2. The logical connections depicted in FIG. 2 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 3:
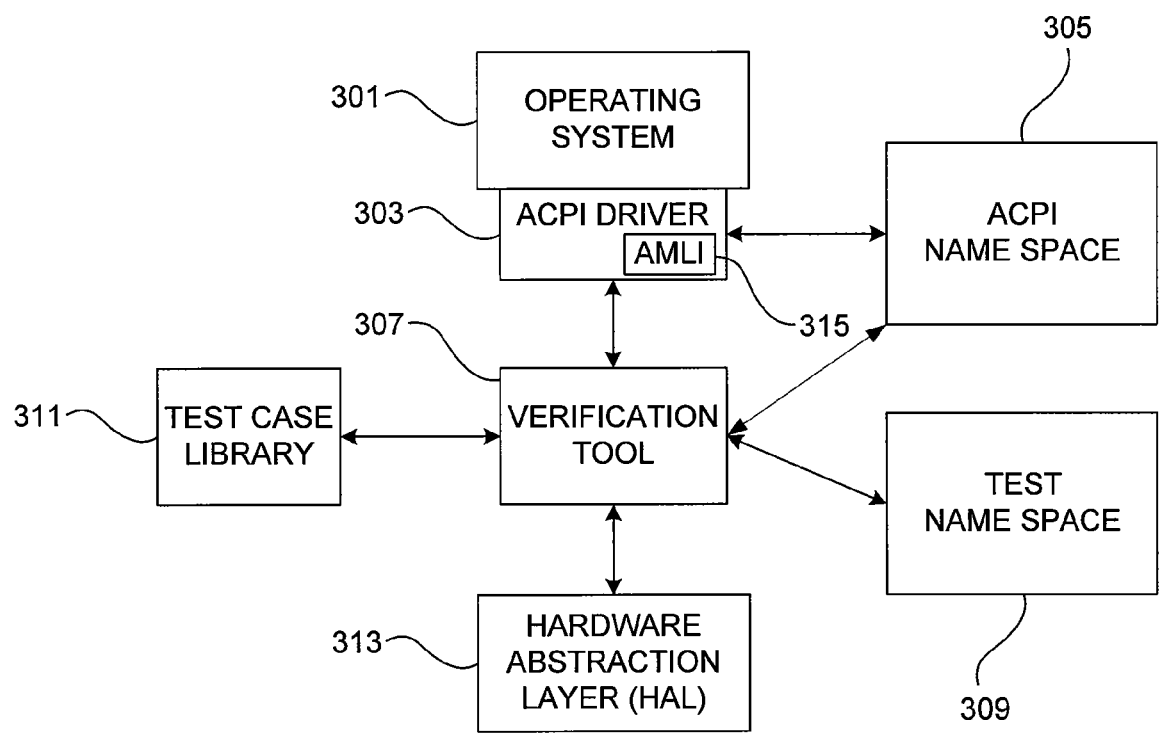
FIG. 3 illustrates a block diagram according to an illustrative embodiment of the invention.

According to one aspect of the invention, with reference to FIG. 3, the verification tool 307 may be embodied in a kernel mode filter driver that resides between the hardware abstraction layer (HAL) 313 and the ACPI driver 303. This insures that the verification tool loads before the ACPI driver evaluates any ACPI objects stored in ACPI name space 305, and also that the verification tool does not get unloaded before the ACPI driver 303 is done evaluating any ACPI objects. This also enables the verification tool to filter the I/O Request Packet (IRP) path between the HAL 313 and the ACPI driver 303.

The ACPI driver 303 acts as the interface for the operating system 301 to evaluate ACPI objects in the ACPI name space 305, and to manipulate power management of hardware through the hardware abstraction layer 313, according to the ACPI specification. The OS ACPI driver 303 typically includes an ACPI machine language interpreter (AMLI) 315, which exports a set of AMLI functions that provide the interface to the ACPI name space. The verification tool hooks into these functions that the AMLI 315 exports. That is, the verification tool 307 is called by the driver 303 before the call of any AMLI function, and again on return from these functions to the driver. In this manner the verification tool has access to the function call's argument(s), as well as any return values generated by these functions.

Verification tool 307, when initialized, copies ACPI name space 305 and stores the copy as test name space 309. Thereafter, when ACPI driver 303 calls a hooked AMLI function, the verification tool validates the called object in test name space 309 using test cases stored in test case library 311.

Figure 4:
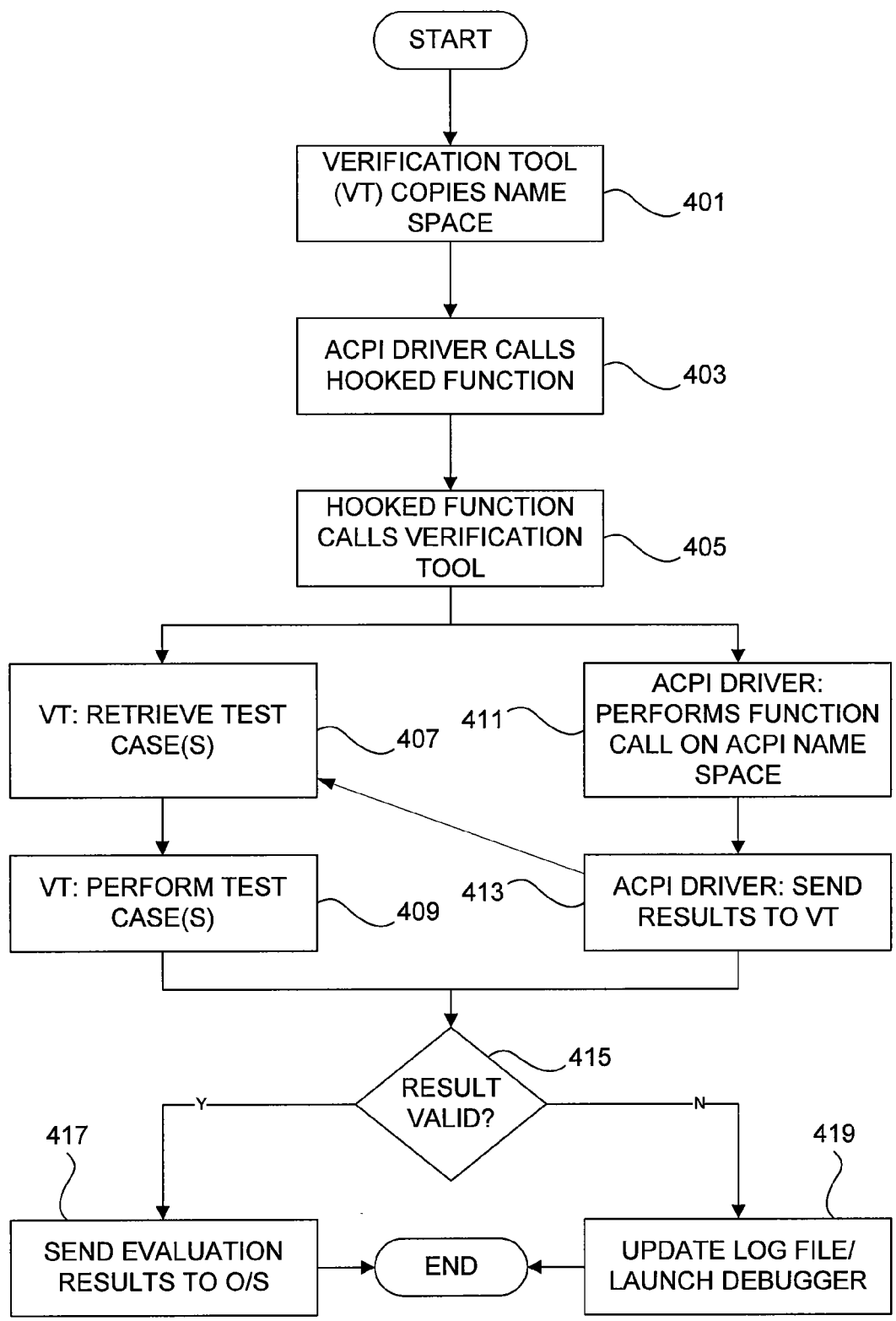
FIG. 4 illustrates a flowchart of a validation method according to an illustrative embodiment of the invention.

FIG. 4 illustrates a flowchart of an illustrative method for verifying an object in the ACPI name space.

In step 401, the verification tool creates a copy of the ACPI name space tree so that the verification tool can save previous evaluation results and other data with each namespace object. For example, suppose the verification tool is validating the _STA object (status) and the _DIS (disable) method. The _STA object returns an indication of whether the device is enabled or disabled, while the _DIS method disables the device. In order to validate whether _STA returns 'disabled' after the _DIS method was called, the verification tool stores in its test name space whether the device is supposed to be enabled or disabled. When the _STA object is evaluated, the verification tool can check whether the returned value matches the expected value.

The verification tool also makes the copy of the ACPI name space to duplicate the child, sibling and parent relationships of the namespace tree for its validations. For example in the above _STA and _DIS example, the verification tool uses the relationship information to find the parent object (the device) of these objects when they get evaluated.

In step 403, the ACPI driver calls one of the hooked functions in response to a request by the OS to access the ACPI namespace, and in step 405, the hooked function simultaneously calls the verification tool. In step 407, the verification tool retrieves from the test case library one or more test cases corresponding to the object that is being evaluated by the OS. In step 409, the verification tool performs the test case(s) on the test name space.

Parallel to step 407, the ACPI driver performs the AMLI function call on the ACPI name space in step 411, which either performs a method or evaluates an object. In step 413, the ACPI driver again calls the verification tool and, when applicable, sends the response received from the function call of step 411 on the ACPI name space. In one illustrative embodiment, steps 407 and 409 are performed simultaneously to steps 411 and 413. In another illustrative embodiment, steps 407 and 409 are performed in parallel to steps 411 and 413.

In step 415, the verification tool compares the data received from the ACPI driver from step 413 with the results of the test cases that the verification tool performed on the test name space from step 409. When the result complies with the ACPI specification (i.e., it validated ok), the verification tool sends the result to the ACPI driver in step 417 to send back to the OS. When the result does not comply with the ACPI specification, the verification tool sends an error message back to the driver in step 419 so that the driver and/or the OS do not malfunction as a result of receiving non-compliant data. The driver (or verification tool) may record the error in a log file or launch a debugging application so that the developer can fix the problem or error.

In one embodiment of the invention, the verification tool may be configured for the WINDOWS® XP brand operating system. However, it should be apparent to one of skill in the art that the principles taught herein may be adapted for other operating systems that are ACPI compliant, and may be programmed in a variety of programming languages.

The verification tool may hook into the AMLI interpreter's exported namespace functions. In an illustrative embodiment, these include the following WINDOWS® XP AMLI functions:

AMLIGetNameSpaceObjet ( )
AMLIGetFieldUnitRegionObj ( )
AMLIEvalNameSpaceObject ( )
AMLIAsyncEvalObjet ( )
AMLINestAsyncEvalObject ( )
AMLIEvalPackageElement ( )
AMLIEvalPkgDataElement ( )
AMLIFreeDataBuffs ( )
AMLIRegEventHandler ( )
AMLIPauseInterpreter ( )
AMLIResumeInterpreter ( )

The verification tool interface may be based on the kernel callback object defined in the WINDOWS® 2000 and WINDOWS® XP driver development kits (DDK), commercially available from Microsoft Corporation of Redmond, Wash. A callback object may be created in the verification tool's DriverEntry section. For example, the callback object may be called "\\Callback\\AMLIHOOK". The operating system's ACPI driver then checks to determine whether the verification tool is installed (the verification tool may be installed at the time of OS setup, or later for debugging purposes) and, if it is, opens the callback object. For example, ACPI.SYS may determine whether the verification tool is installed when ACPI.SYS is loaded into the registry.

Using the callback object definition:

```
VOID
(*PCALLBACK_FUNCTION ) (
    IN PVOID CallbackContext,
    IN PVOID Argument1,
    IN PVOID Argument2
    );
```

The verification tool may register the callback function using the DDK defined function ExRegisterCallback( ). The operating system's ACPI driver may notify the callback object using the DDK defined function ExNotifyCallback( ). Each time one of the AMLI functions that are hooked by the verification tool gets called, the ACPI driver assembles the arguments and returns data to an data structure storing data arguments, and calls ExNotifyCallback( ), passing ExNotifyCallback a pointer to the arguments data structure. The ACPI driver may call the verification tool both before each AMLI function is called, and again after each AMLI function returns. The verification tool is called twice because the evaluation of some namespace objects may hang the system (i.e., cause a system malfunction), and, by calling the verification tool before each AMLI function, the verification tool knows what is about to be evaluated, and can communicate this information to the debugger. Later, by calling the verification tool after each AMLI function returns, the verification tool knows the return value from each evaluation.

The arguments data structure may include data corresponding to the hooked functions, state information, data package information, hooked function arguments and return values, and whether the hooked function was a success or failure. In one aspect, the arguments data structure may be defined as follows:

```
typedef struct _AMLIHOOK_DATA
{
  UCHAR Type;
  UCHAR SubType;
  ULONG State;
  ULONG Id;
  ULONG_PTR Arg1;
  ULONG_PTR Arg2;
  ULONG_PTR Arg3;
  ULONG_PTR Arg4;
  ULONG_PTR Arg5;
  ULONG_PTR Arg6;
  ULONG_PTR Arg7;
  NTSTATUS Ret;
} AMLIHOOK_DATA , *PAMLIHOOK_DATA;
```

Type may be further defined as:

define ACPIVER_DATA_TYPE_AMLI    ((UCHAR)1)

for the AMLI function hooks. SubType indicates to which hooked AMLI functions the data corresponds.

SubTypes may be further defined as:
define ACPIVER_DATA_SUBTYPE_GET_NAME_SPACE_OBJECT ((UCHAR)1)
define ACPIVER_DATA_SUBTYPE_GET_FIELD_UNIT_REGION_OP ((UCHAR)2)
define ACPIVER_DATA_SUBTYPE_EVAL_NAME_SPACE_OBJECT ((UCHAR)3)
define ACPIVER_DATA_SUBTYPE_ASYNC_EVAL_OBJECT ((UCHAR)4)
define ACPIVER_DATA_SUBTYPE_NEST_ASYNC_EVAL_OBJECT ((UCHAR)5)
define ACPIVER_DATA_SUBTYPE_REG_EVENT_HANDLER ((UCHAR)6)
define ACPIVER_DATA_SUBTYPE_EVAL_PACKAGE_ELEMENT ((UCHAR)7)
define ACPIVER_DATA_SUBTYPE_EVAL_PKG_DATA_ELEMENT ((UCHAR)8)
define ACPIVER_DATA_SUBTYPE_FREE_DATA_BUFFS ((UCHAR)9)
define ACPIVER_DATA_SUBTYPE_PAUSE_INTERPRETER ((UCHAR)10)
define ACPIVER_DATA_SUBTYPE_RESUME_INTERPRETER ((UCHAR)11)

The state:

define AMLIHOOK_TEST_DATA_STATE_CALL    1 indicates that the present state is before the AMLI function specified in SubType has been called.

The state:

define AMLIHOOK_TEST_DATA_STATE_RETURN    2 indicates that the present state is after the AMLI function specified in SubType has been called.

The state:

define AMLIHOOK_TEST_DATA_STATE_ASYNC_CALL    3 indicates the present state corresponds to an asynchronous function. That is, some of the hooked functions (e.g., AMLINestAsyncEvalObject and AMLIAsyncEvalObject) may be an asynchronous function call (i.e., the function will return before the ACPI object is evaluated). After the ACPI object is evaluated, the ACPI driver calls a callback function with the object's status (i.e., did it evaluate successfully or did it return an error) and the return data. AMLIHOOK_TEST_DATA_STATE_ASYNC_CALL provides a generic way to indicate to the verification tool that this data is the return data, and that status data follows at a later time. That is, it indicates that the AMLI function specified in SubType has not been called yet. Because the verification tool is called twice for every hooked AMLI function, the state indicates to the verification tool whether it is before or after the actual AMLI function was called.

The ID variable is used by the verification tool to associate the AMLIHOOK_TEST_DATA_STATE_CALL and AMLIHOOK_TEST_DATA_STATE_RETURN AMLIHOOK_DATA packages. Arg1-Arg7 may be used to pass the hooked function's arguments, and any return values.

The hooked AMLI function returns an NTSTATUS code. The Ret variable represents this NTSTATUS code to return to the verification tool the success or failure of the hooked functions. If the verification tool is called after the actual AMLI function has been called, the Ret variable represents the status of this call.

As stated above, the verification tool makes a copy of the ACPI name space to use as a test name space, and also stores relationship information regarding the test name space tree. When the OS (i.e., WINDOWS® XP) is initially loaded, the ACPI driver calls AMLIGetNameSpaceObject( ) to get the \_SB namespace object (the root object for all devices and bus objects) when a name space table is loaded (e.g., DSDT, SSDT), and traverses the entire tree, running the _INI method on the new objects. Because the verification tool hooks into the AMLIGetNameSpaceObject( ) function, the verification tool will receive a pointer to the ACPI \_SB name space object before the ACPI driver does. The verification tool then traverses the entire tree, creates a copy of the name space, and stores it as the test name space. When the ACPI driver repeats this process for other name space tables, the verification tool again intercepts and traverses the entire tree before the ACPI driver does, and the verification tool appends the new nodes to the test name space tree. The verification tool may optionally discard the pointer to the ACPI name space, as the verification tool can evaluate objects and perform functions on the test name space without reference to the ACPI name space.

The test ACPI name space object structure may be defined as:

```
typedef struct _ACPIVER_NSOBJ
{
  VOID * Child;
  VOID * Sibling;
  VOID * LastSibling; // Used to append to the Sibling list.
  VOID * Parent;
  ULONG dwNameSeg;
  ULONG ObjType;
  GEN_FEATURE_LIST FeatureList;
} ACPIVER_NSOBJ, *PACPIVER_NSOBJ;
```

The fields Child, Sibling, LastSibling, and Parent may be used to connect the various nodes to form the tree. The field dwNameSeg may hold the four bytes for the ACPI object name as defined in the ACPI specification. The field ObjType, defined by the ACPI specification, indicates the type of ACPI name space object that the present node refers to. The field FeatureList is discussed below, and contains information on which validation is based.

Of the hooked functions, the following evaluate objects in the ACPI name space:

AMLIEvalNameSpaceObject ( )
AMLIAsyncEvalObjet ( )
AMLINestAsyncEvalObject ( )
AMLIEvalPackageElement( )

When the verification tool is called as a result of one of these four functions being called, the verification tool accepts the ACPI driver's NSOBJ pointer (i.e., a pointer to the ACPI name space object structure) as a parameter from the AMLIHOOK_DATA structure. The verification tool then creates an absolute path string from the root name space object to this name space object so that it can find the corresponding object in the test name space. That is, the verification tool uses the path string to locate in its own tree the name space object to be evaluated. After the name space object is found and evaluated, the verification tool saves the evaluation result, and may optionally perform further validation based on the test case(s) stored in the library, as described below.

As referenced above, FeatureList is a pointer field in the ACPIVER_NSOBJ data structure (i.e., the test name space), which references the head of a feature list. Each node in the feature list stores a test case that is used to validate the object to which it refers. Thus, while logically the test case library is separate from the test name space, the library may be stored in a distributed manner throughout the test name space data structure. As the verification tool locates name space objects in the test name space tree, for example because of one of the four above-referenced 'Eval' functions is being called, the verification tool processes any test cases linked to by FeatureList. Each test case node in FeatureList may be defined as:

```
typedef struct _GEN_FEATURE_NODE_HEADER
{
SINGLE_LIST_ENTRY Next;
CHAR Type;
CHAR Flags;
GEN_FEATURE_PROCESS_FUNC ProcessFunc;
GEN_FEATURE_FREE_FUNC FreeFunc;
GEN_FEATURE_CONTROL_FUNC ControlFunc;
CHAR Body[1];
} GEN_FEATURE_NODE_HEADER,
*PGEN_FEATURE_NODE_HEADER;
```

When the verification tool processes FeatureList, each node's ProcessFunc may be called. The ProcessFunc receives as input the reason it is being called (described below), a pointer to a translated version of the AMLIHOOK_DATA data, and a pointer to the test name space object. Data stored in AMLIHOOK_may be translated into text form including the data type value, the data type, and a string representation of the data portion. This provides a generic way to compare and log the data, and allows the verification tool to perform operations on the translated data.

The verification tool's validation (i.e., execution of test cases) may be performed by the ProcessFunc functions referenced in each FeatureList. In order to add a new test case, a new node can be added to the applicable FeatureList. This also makes it possible to make generic assertions and add them to multiple copies of FeatureList. FeatureList nodes may be created when the tree is created, or they can be added dynamically by any other ProcessFunc function.

To add a GenFeature node to a GenFeatureList, the verification tool calls the following function, passing the GEN_FEATURE_NODE_INFO structure:

```
NTSTATUS
AddGenFeatureToGenFeatureList(
    PGEN_FEATURE_LIST GenFeatureList,
    PGEN_FEATURE_NODE_INFO GenFeatureNodeInfo,
    VOID * Context,
    VOID * Context2);
typedef struct _GEN_FEATURE_NODE_INFO
{
CHAR Type;
ULONG GenFeatureBodySize;
GEN_FEATURE_PROCESS_FUNC ProcessFunc;
GEN_FEATURE_FREE_FUNC FreeFunc;
GEN_FEATURE_CONTROL_FUNC ControlFunc;
GEN_FEATURE_INIT_FUNC InitFunc;
} GEN_FEATURE_NODE_INFO ,
*PGEN_FEATURE_NODE_INFO;
```

The Type field indicates the present node's test case type, as populated by the test library. Many test cases may need to know the value that an object returned the last time it was evaluated. Thus, one generic feature may save the return data from an evaluation in the field AMLI_FEATURE_LAST_EVAL_RESULT. Another generic feature may determine whether the return value from an evaluation is the same every time an object gets evaluated. The Type value is defined by the test assertion. The field GenFeatureBodySize specifies how much local storage the present feature uses. The local storage may be allocated to the end of a GEN_FEATURE_NODE_HEADER structure. This buffer is then passed to the ProcessFunc, FreeFunc, ControlFunc, and InitFunc functions as the Body parameter.

The field ProcessFunc may be defined as:

```
NTSTATUS
(* GEN_FEATURE_PROCESS_FUNC) (
    VOID * Body,
    LONG Type,
    VOID * Context,
    VOID * Context2);
```

In ProcessFunc, the Type field defines why the function is being called. The possible reasons for calling ProcessFunc may include:

```
ACPIVER_PROCESS_TYPE_EVAL   //The object has been evaluated.
ACPIVER_PROCESS_TYPE_INIT   //The feature has just been created
                            //and added to a list; this only
                            //will be called once for the
                            //lifetime of the feature.
```

```
-continued
ACPIVER_PROCESS_TYPE_SLEEP      //On a system sleep cycle after the
                                //AMLI interpreter has been paused
                                //this will be called.
ACPIVER_PROCESS_TYPE_REF_PARENT    //Every type we process an
                                   //ACPIVER_NSOBJ GenFeatureList
                                   //the parent's ACPIVER_NSOBJ
                                   //GenFeatureList will also be
                                   //processed with this type.
ACPIVER_PROCESS_TYPE_UNREF_PARENT  //Every time we are done
                                   //processing an
                                   //ACPIVER_NSOBJ
                                   //GenFeatureList the
                                   //parent's ACPIVER_NSOBJ
                                   //GenFeatureList will
                                   //also be processed with
                                   //this type.
```

The field FreeFunc may be defined as:

```
NTSTATUS
(* GEN_FEATURE_FREE_FUNC) (
  VOID * Body,
  VOID * Context,
  VOID * Context2);
``` and is called before the feature is removed. If the verification tool does not need to free any resources or other work before the feature is removed (e.g., to store AMLI_FEA-TURE_LAST_EVAL data), this can be set to NULL.

ControlFunc supports the verification tool's set of user mode interfaces that may be used to enumerate the test name space tree. ControlFunc also supports a user mode API to get information (i.e., data) from a specific feature of a test name space object. ControlFunc may be defined as:

```
NTSTATUS
(* GEN_FEATURE_CONTROL_FUNC) (
  VOID * Body,
  VOID * Context,
  VOID * Context2,
  ULONG Type,
  ULONG SubType,
  VOID * InBuff,
  ULONG InBuffSize,
  VOID * OutBuff,
  ULONG OutBuffLen,
  ULONG * Return);
```

InitFunc, defined below, may be called once by AddGen-FeatureToGenFeatureList to create the feature:

```
NTSTATUS
(* GEN_FEATURE_INIT_FUNC) (
  VOID * Body,
  VOID * Context,
  VOID * Context2);
```

As stated above, the verification tool includes the validation engine and the test assertions. The test assertions may be stored in a library that is linked to the verification tool engine.

This library may export the two functions:

```
PACPI_OBJ_TEST_BLOCK
FindObjTestBlock(
  ULONG NameSeg,
  ULONG ParentObjType,
  ULONG ParentNameSeg);
BOOLEAN
FindObjTestBlockByObjType(
  ULONG ObjType,
  PACPI_OBJ_TEST_BLOCK * ObjTestBlock);
```

The above two functions return an array of GEN_FEA-TURE_NODE_INFO for the given test name space object information. The verification tool engine, as it creates the test name space tree, calls both of these functions for every new ACPI name space object it traverses, and determines whether the test case library contains any GenFeature that should be associated with this namespace object. NameSeg (or Obj-Type) map to members in ACPIVER_NSOBJ. When a new object is created in the test names space, the verification tool may call the above two functions to determine whether there there is a feature list for this node. If a feature list is found (e.g., a genfeature list), the verification tool may call a function to add the feature list to the test name space object's feature list. In an illustrative embodiment, the verification tool calls AddGenFeatureToGenFeatureList to add the feature list to the ACPIVER_NSOBJ object's FeatureList.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A computer-performed method of validating a power management command prior to executing the power management command, comprising:

intercepting from a power management driver module the power management command;

testing the power management command in a test name space prior to performing the power management command in a second name space; and generating an output based on a comparison of a first result obtained from testing the power management command in the test name space and a second result obtained from performing the power management command in the second name space.

2. The method of claim 1, wherein the power management command comprises an ACPI command.

3. The method of claim 1, wherein the second name space comprises an ACPI name space.

4. The method of claim 1, wherein testing comprises the steps of:
A) retrieving from a library a test case set corresponding to the command; and
B) performing in the test name space any test cases defined by the test case set.

5. The method of claim 1, further comprising the step of, when any test case does not validate according to predefined rules, performing at least one of logging an error to a log file, and initiating a debugging application.

6. The method of claim 1, further comprising the step of, when the execution of the command completes, intercepting a result of executing the command.

7. The method of claim 1, wherein intercepting the command comprises calling a callback function.

8. The method of claim 6, wherein intercepting results comprises calling a callback function.

9. The method of claim 1, wherein the test name space comprises a duplication of the second name space.

10. A data structure stored on one or more computer readable media, said data structure comprising:
a first data field storing an ACPI name space;
a second data field storing a test name space corresponding to the ACPI name space, wherein the second data field comprises a duplication of the first data field; and
a third data field storing a test case to be executed in the test name space upon interception of an ACPI command to be executed in the ACPI name space.

11. The data structure of claim 10, wherein the ACPI command comprises a command to evaluate an object in the ACPI name space.

12. The data structure of claim 10, further comprising a fourth data field storing a log file of results of any test cases executed in the test name space.

13. A computer readable medium storing computer readable instructions that, when executed, perform a method of validating a computer power management command, said method comprising:
creating a second name space by copying entries from a first name space;
intercepting the computer power management command from a driver module prior to execution of the computer power management command;
obtaining at least one test case associated with the computer power management command;
conducting the at least one test case on the second name space;
performing the computer power management command on the first name space; and
selectively indicating an error in the performance of the computer power management command in response to a comparison of a first result from conducting the at least one test with a second result from performing the computer power management command.

14. The computer readable medium of claim 13, wherein the computer power management command comprises an ACPI command.

15. The computer readable medium of claim 14, wherein the ACPI command comprises a command to evaluate an ACPI object.

16. The computer readable medium of claim 15, wherein the at least one test case corresponds to the ACPI object.

17. The computer readable medium of claim 13, wherein the computer readable instructions further comprise and operating system and the at least one test is conducted prior to indicating to the operating system a result of executing the computer power management command.

18. The computer readable medium of claim 13, wherein selectively indicating an error comprises:
generating an error message after comparing the first result and the second result; and
recording the error message in a log file.

19. The computer readable medium of claim 18, wherein the name space comprises an ACPI name space.

* * * * *